(12) United States Patent
Moe

(10) Patent No.: US 6,606,973 B2
(45) Date of Patent: Aug. 19, 2003

(54) ROTARY ENGINE

(76) Inventor: Cordell R. Moe, 375 - 157th Ave. NW., Andover, MN (US) 55304

( * ) Notice: Subject to any disclaimer, the term of this patent is extended or adjusted under 35 U.S.C. 154(b) by 0 days.

(21) Appl. No.: 10/155,415

(22) Filed: May 23, 2002

(65) Prior Publication Data

US 2003/0000496 A1 Jan. 2, 2003

Related U.S. Application Data

(60) Provisional application No. 60/293,390, filed on May 23, 2001.

(51) Int. Cl.⁷ .................................................. F02B 53/04
(52) U.S. Cl. ........................ 123/228; 123/237; 123/238; 123/290
(58) Field of Search ............................... 123/237, 236, 123/238, 231, 228, 209, 198 F, 25 C, 193.6, 290, 1 A, 193.1, 193.4, 44/373; 431/4

(56) References Cited

U.S. PATENT DOCUMENTS

| | | | | |
|---|---|---|---|---|
| 1,156,697 A | * | 10/1915 | Lamar | 123/237 |
| 1,189,115 A | * | 6/1916 | Jameson et al. | 123/237 |
| 1,722,517 A | * | 7/1929 | Curtis | 123/290 |
| 2,447,929 A | * | 8/1948 | Berry | 123/238 |
| 2,551,073 A | | 5/1951 | Waldron | 123/25 |
| 2,688,320 A | * | 9/1954 | Czarnocki | 123/193.4 |
| 2,735,416 A | * | 2/1956 | Derguson et al. | 123/193.1 |
| 3,798,012 A | | 3/1974 | Le Suer | 44/51 |
| 3,871,337 A | | 3/1975 | Green et al. | |
| 3,957,021 A | | 5/1976 | Loyd, Jr. | 123/209 |
| 4,020,798 A | * | 5/1977 | Skala | 123/1 A |
| 4,037,415 A | | 7/1977 | Christopher et al. | |
| 4,080,935 A | | 3/1978 | Olson | |
| 4,314,533 A | | 2/1982 | Barata et al. | |
| 4,378,764 A | * | 4/1983 | Jorgensen | 123/290 |
| 4,454,844 A | | 6/1984 | Kinsey | |
| 4,488,866 A | | 12/1984 | Schirmer et al. | 431/4 |
| 4,552,107 A | | 11/1985 | Chen | |
| 4,658,779 A | | 4/1987 | del Granado | 123/237 |
| 4,741,164 A | | 5/1988 | Slaughter | 60/627 |
| 5,170,751 A | | 12/1992 | Tosa et al. | 123/25 C |
| 5,174,247 A | | 12/1992 | Tosa et al. | 123/25 C |
| 5,235,945 A | | 8/1993 | Testea | |
| 5,299,418 A | | 4/1994 | Kerrebrock | |
| 5,307,619 A | | 5/1994 | McCarty et al. | |
| 5,494,014 A | | 2/1996 | Lobb | |
| 5,507,142 A | | 4/1996 | Wintonyk | |
| 5,509,388 A | | 4/1996 | Andres | |
| 5,517,960 A | | 5/1996 | Whang | |
| 5,522,349 A | | 6/1996 | Yoshihara et al. | 123/25 C |
| 5,524,577 A | | 6/1996 | Clifford | 123/44 |
| 5,529,549 A | | 6/1996 | Moyer | 123/198 F |

(List continued on next page.)

FOREIGN PATENT DOCUMENTS

JP 358206827 A 12/1983 ................. 123/237

*Primary Examiner*—Thomas Denion
*Assistant Examiner*—Thai Ba Trieu
(74) *Attorney, Agent, or Firm*—Patterson, Thuente, Skaar & Christensen, P.A.

(57) ABSTRACT

A rotary engine utilizes an expansion chamber and an oscillating rotary piston to capture the energy of expanding combustion gases through out substantially all of each revolution of the piston. The movement of the oscillating rotary piston is guided by the combined action of a hub having a saddle supporting the rotary piston and a cam track. The invention burns fuel in a separate combustion chamber charged from a coaxially mounted compressor and controlled by a pass gate sentry valve. The rotary engine of the invention is cooled by an internal coolant injection system. The injection fluid coolant solution may contain a alkaline reagent to react with and neutralize acidic components of the combustion gases which would otherwise remain in the exhaust and contribute to air pollution. The rotary engine of the present invention is adaptable to compression ignition fuels and spark ignition fuels. The invention may be constructed of conventional metallic materials as well as composites and ceramics.

25 Claims, 5 Drawing Sheets

U.S. PATENT DOCUMENTS

| | | | |
|---|---|---|---|
| 5,531,199 | A | 7/1996 | Bryant et al. |
| 5,537,957 | A | 7/1996 | Gutkin |
| 5,537,973 | A | 7/1996 | Wittry |
| 5,551,383 | A | 9/1996 | Novotny |
| 5,553,574 | A | 9/1996 | Duncalf |
| 5,555,866 | A | 9/1996 | Wilson |
| 5,571,244 | A | 11/1996 | Andres |
| 5,595,154 | A | 1/1997 | Smith |
| 5,605,124 | A | 2/1997 | Morgan |
| 5,666,912 | A | 9/1997 | McLachlan |
| 5,701,872 | A | 12/1997 | Kaku et al. |
| 5,704,332 | A | 1/1998 | Motakef |
| 5,709,088 | A | 1/1998 | Acaster |
| 5,709,188 | A | 1/1998 | Al-Qutub .................... 123/204 |
| 5,711,265 | A | 1/1998 | Duve |
| 5,720,241 | A | 2/1998 | Gail |
| 5,720,257 | A | 2/1998 | Motose et al. |
| 5,749,337 | A | 5/1998 | Palatov |
| 5,755,197 | A | 5/1998 | Oplt |
| 5,758,617 | A | 6/1998 | Saito |
| 5,782,213 | A | 7/1998 | Pedersen |
| 5,794,573 | A | 8/1998 | Sunley |
| 5,803,041 | A | 9/1998 | Motakef |
| 5,806,315 | A | 9/1998 | Mui |
| 5,819,699 | A | 10/1998 | Burns |
| 5,829,407 | A | 11/1998 | Watson et al. |
| 5,832,731 | A | 11/1998 | Kuehnle |
| 5,870,980 | A | 2/1999 | Hooper et al. |
| 5,890,465 | A | 4/1999 | Williams |
| 5,930,990 | A | 8/1999 | Zachary et al. |
| 5,964,087 | A | 10/1999 | Tort-Oropeza |
| 6,003,486 | A | 12/1999 | Vanmoor |
| 6,032,622 | A | 3/2000 | Schmied |
| 6,035,630 | A | 3/2000 | Soós |
| 6,039,552 | A | 3/2000 | Mimura |
| 6,062,188 | A | 5/2000 | Okamura |
| 6,071,098 | A | 6/2000 | Richards |
| 6,082,324 | A | 7/2000 | Liu |
| 6,095,100 | A | 8/2000 | Hughes .................... 123/25 C |
| 6,119,649 | A | 9/2000 | Raab |
| 6,125,796 | A | 10/2000 | Coleman |
| 6,125,813 | A | 10/2000 | Louthan et al. ............. 123/209 |
| 6,125,814 | A | 10/2000 | Tang |
| 6,128,897 | A | 10/2000 | Kuhn |
| 6,129,068 | A | 10/2000 | Wingate, Jr. |
| 6,132,197 | A | 10/2000 | Adamovski et al. |
| 6,142,758 | A | 11/2000 | Taggett |
| 6,148,775 | A | 11/2000 | Farrington |
| 6,155,214 | A | 12/2000 | Manthey |
| 6,158,410 | A | 12/2000 | Piock et al. |
| 6,170,455 | B1 | 1/2001 | Eissler et al. ............ 123/193.6 |
| 6,196,167 | B1 | 3/2001 | Marsh et al. |
| 6,210,135 | B1 | 4/2001 | Rassin et al. |
| 6,237,560 | B1 | 5/2001 | Saito |
| 6,247,443 | B1 | 6/2001 | Pelleja |
| 6,250,279 | B1 | 6/2001 | Zack |
| 6,276,329 | B1 | 8/2001 | Archer |
| 6,279,518 | B1 | 8/2001 | Cooley, Sr. |
| 6,279,550 | B1 | 8/2001 | Bryant |
| 6,289,867 | B1 | 9/2001 | Free |
| 6,298,821 | B1 | 10/2001 | Bolonkin |
| 6,360,701 | B1 | 3/2002 | Ruch |

\* cited by examiner

*Fig. 8A*      *Fig. 8B*
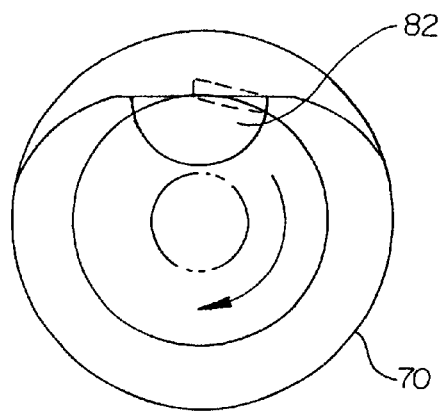
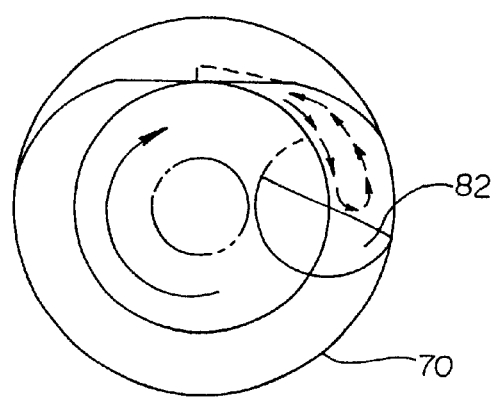
*Fig. 8C*      *Fig. 8D*
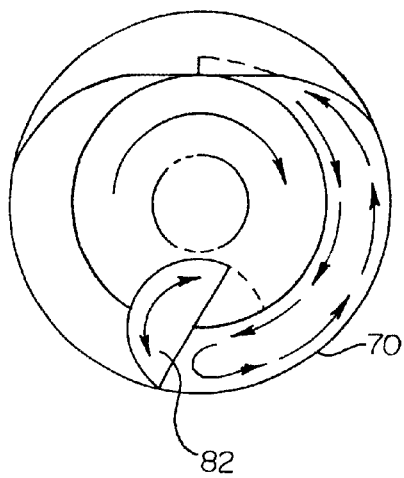
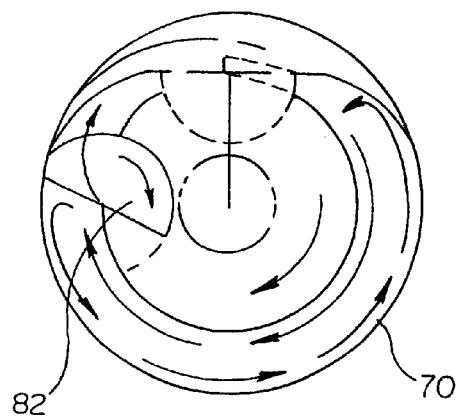

ROTARY ENGINE

RELATED APPLICATION INFORMATION

This application claims benefit of U.S. Provisional Application No. 60/293,390, filed May 23, 2001, which is hereby incorporated by reference.

TECHNICAL FIELD

The generally invention relates to internal combustion engines and, more particularly, to a piston driven rotary-type internal combustion engine.

BACKGROUND OF THE INVENTION

Engine designers are constantly endeavoring to design engines that maximize fuel efficiency while minimizing polluting byproducts of the combustion process. Fuel consumption has both a direct effect on the output of pollutants and the expense for the fuel used. Moreover, increasing the fuel efficiency of machinery using non-renewable resources, such as gasoline derived from oil, is an important social value. Minimizing pollutants minimizes the injurious effects on the environment and benefits the health of society on a global scale.

There have been many attempts to attain efficiency increases while minimizing pollutants. The rotary engine is one example of such attempts. The principal characteristics of conventional rotary internal combustion engines are well known in the field of art. Generally, a rotary engine uses the pressure of combustion to move a triangular rotor within an epitrochoidal-shaped rotor housing. The four cycles of conventional combustion—intake, compression, combustion and exhaust—each take place in its own portion of the housing. These cycles cause the rotor to rotate an eccentric output shaft geared to the rotor. The rotary engine seemingly would have increased efficiency due to the decrease of moving parts, a combustion event of 270° of the output shaft rotation on every rotation, and better balance, since the rotor and shaft move in the same direction.

Despite these advantages, the conventional rotary engine has found little commercial success because the long and shallow shape of the combustion chamber hurts both emissions and fuel economy performance with respect to conventional piston engines. The relatively brief time period of the power stroke of the piston on the power portion of the rotary motion does not allow for complete combustion of the fuel. This leads to the exhaust of unburned hydrocarbons that must be cleaned up by a catalytic converter.

Known rotary engines, though capable of producing relatively high power output for their weight and size, have generally been too complex and, in operation, have exhibited excessively high wear, short useful life and relatively high fuel consumption. In operation, they generally produce undesirably high nitric oxide and unburned or partially burned hydrocarbon outputs. All of these add to problems of air pollution. Thus, the efficiency and emissions goals are not satisfied.

Another attempt to meet the efficiency and emissions goals is through the use of diesel cycle engines. The diesel cycle uses compression of a fuel and air mixture to ignite a combustion event, rather than a spark. This allows the diesel engine to utilize direct injection of the fuel and a higher compression ratio than ordinary gasoline. The higher compression ratio results in better efficiency than for ordinary gasoline engines. Moreover, diesel fuel has a higher energy density than gasoline. The combination of greater energy density and higher compression results in much-improved fuel efficiency.

However, diesel cycle engines perform poorly in emissions performance. The combustion in a diesel engine produces significant amounts of polluting nitrogen oxides $NO_X$). This is especially true in large-scale uses, such as ship engines, or as power sources for electric generation plants. These $NO_X$ have been addressed primarily through the use of selective catalytic reduction of the nitrogen oxides. Catalytic converter use at large-scale diesel engines, such as ships and power plants, is not always feasible due to costs and space concerns. Therefore, elimination of the formation of $NO_X$ in the combustion chamber has been a focus of technological development.

One measure to reduce $NO_X$ in diesel engines is through the injection of water into the combustion chamber to reduce the combustion temperature. The goal is to reduce the peak temperature arising at the flame, which results in a reduction in $NO_X$ formation. Forming fewer $NO_X$ equals fewer $NO_X$ emissions from the engine. Typically, the water is injected into the combustion chamber shortly before combustion, during combustion, or is mixed with the fuel before injection. A conventional four-stroke diesel engine usually injects the water towards the end of the compression stroke. The use of water injection on a piston-driven diesel engine addresses the emissions concerns to a certain degree. However, the use of a four-cycle reciprocating engine design still has the inherent efficiency drawbacks of producing only one 180° power stroke for every other cycle of the piston.

Attempts have been made to design a diesel-fueled rotary engine. U.S. Pat. No. 3,957,021, to Loyd, discloses a rotary diesel engine. Said patent discusses the prior unsatisfactory attempts to utilize diesel fuel in rotary engines. The prior attempts produced unsatisfactory results due to the inability to create sufficient compression in the combustion chamber portion of the rotary housing. The Loyd patent addresses the compression problem by providing a precombustion chamber adjacent to the rotor housing and in communication with the housing.

A fuel injector is disposed in the chamber for injecting fuel into the supplied combustion air. The combustion air is provided, in part, by a compressor, which ensures a sufficient pressure is maintained to combust the diesel fuel. The introduction of fuel into the precombustion chamber in the presence of high pressure and temperature causes the combustion of the fuel to flash into the working chamber of the housing via an outlet port. The burning continues in the working chamber to cause the rotor to rotate the output shaft.

U.S. Pat. No. 6,125,813, to Louthan et al., discloses an alternate method of providing a precombustion chamber to a diesel fueled rotary engine without the need for a separate compressor. However, Louthan and Loyd do not address the emissions issues associated with triangular rotors or with the use of diesel fuel, as discussed previously. Therefore, there is a continuing need to provide an internal combustion engine with improved fuel economy and reduced emissions.

SUMMARY OF THE INVENTION

The positive displacement turbine solves many of the above-indicated problems of rotary engines by providing a rotary engine, which produces an exhaust low in air pollutants while operating efficiently and requiring minimal cooling.

The positive displacement turbine generally comprises a separate compressor, combustion chamber and expansion chamber. The expansion chamber utilizes a crescent-shaped piston, a hub and a cam track in order to extract maximum energy from expanding combustion gases. The positive displacement turbine may also utilize an internal coolant injector system. The coolant injector system assists in cooling the positive displacement turbine, improves efficiency by water injection, and injects a chemical exhaust precipitator into the combustion chamber to react with and precipitate pollutants from the exhaust stream, leaving only carbon dioxide and a few inert gases to escape into the atmosphere.

The positive displacement turbine is adaptable for use with many different fuels, including diesel fuel, gasoline and gaseous fuels including hydrogen. It is adaptable and scaleable for various-sized applications. The invention is also well-adapted to be manufactured from non-traditional engine materials such as composites and ceramics.

BRIEF DESCRIPTION OF THE DRAWINGS

FIG. 8 schematically depicts a sequence of operation showing the relative motions of the hub and a crescent piston according to an embodiment of the present invention;

FIG. 8A depicts the expansion chamber with the crescent piston at top dead center;

FIG. 8B depicts the expansion chamber with the crescent piston at 90° rotation;

FIG. 8C depicts the expansion chamber with the crescent piston at 180° rotation; and FIG. 8D depicts the expansion chamber with the crescent piston at 270° rotation.

DETAILED DESCRIPTION OF THE INVENTION

Figure 1:
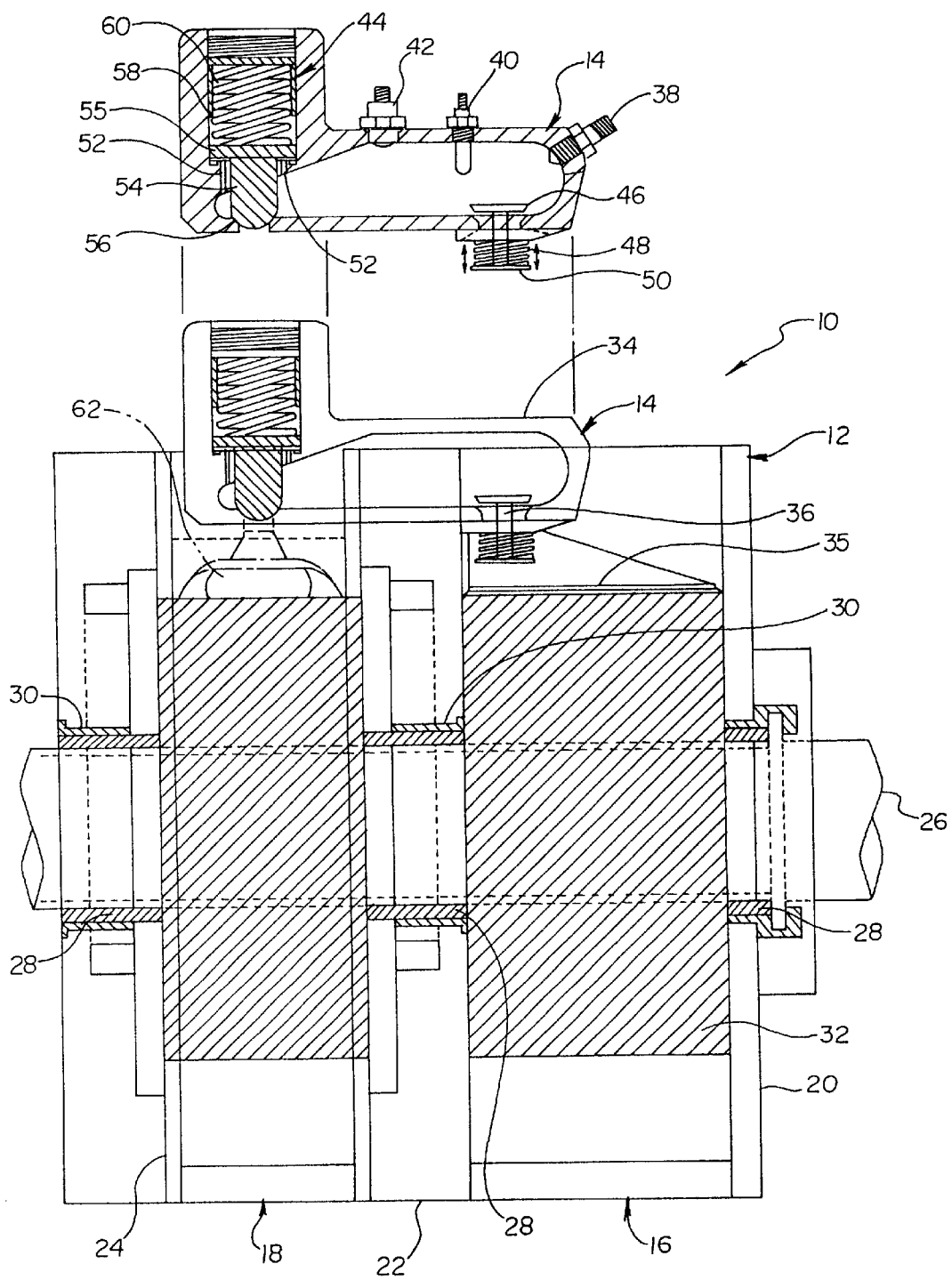
FIG. 1 is a sectional view of the positive displacement turbine according to an embodiment of the present invention.
Figure 4:
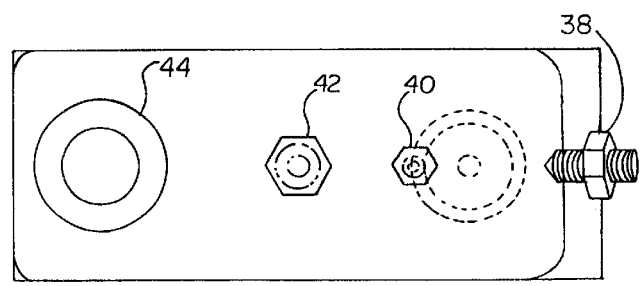
FIG. 4 is a top elevational view of the combustion chamber of FIG. 2 according to an embodiment of the present invention.
Figure 3:
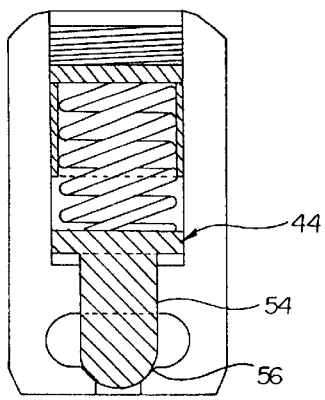
FIG. 3 is a sectional view of a pass gate sentry valve according to an embodiment of the present invention.
Figure 2:
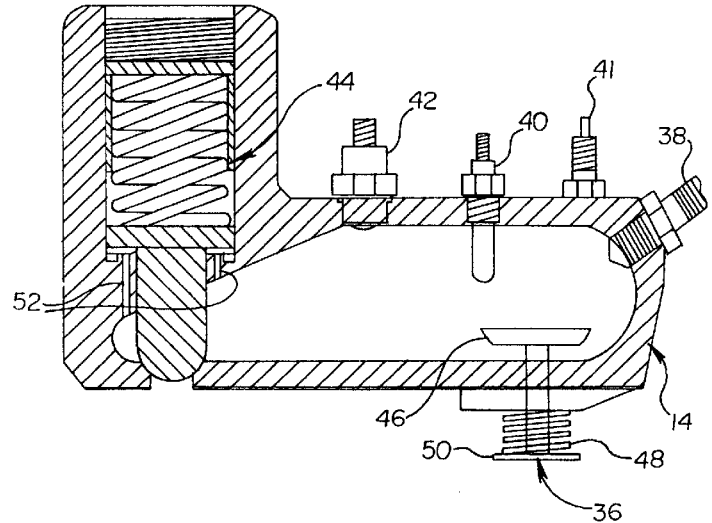
FIG. 2 is a front sectional view of a combustion chamber according to an embodiment of the present invention.

Referring to FIG. 1, the positive displacement turbine (PDT) 10 generally includes housing 12, combustion chamber 14, compressor section 16 and expansion section 18. The PDT 10 may be constructed from a variety of materials, including conventional steel, cast iron or aluminum, as well as ceramics and composites. Constructing the PDT 10 of aluminum, steel, cast iron or a combination of these materials offers the opportunity for the PDT 10 to be readily manufactured using presently available production facilities without the need for extensive retooling. However, non-metallic low thermal conductivity ceramics and carbon fiber composites may be preferable for construction of the PDT 10. Ceramics and carbon composites offer the advantages of being strong, lightweight and recyclable, as well as facilitating simple and inexpensive manufacturing of the PDT 10. A further advantage of the use of ceramics and carbon composites is that they will allow the manufacturing of a hermetically sealed engine unit. A hermetically sealed engine unit will prevent the end user from tampering with the tuning of the engine, thereby maintaining highly efficient operation.

Ceramics are commercially available for many providers, such as Dow-Corning and Champion Spark Plug, Ceramic Division. Carbon fiber composites and other composites are commercially available from DuPont.

Housing 12 generally includes compressor end 20, center partition 22, and expansion chamber end 24. Shaft 26 passes through, and is indirectly supported by, compressor end 20, center partition 22 and expansion chamber end 24. Shaft 26 is preferably made of steel, iron or Kevlar carbon fiber composite. Shaft 26 is directly supported by appropriate bearings 28 and sealed by appropriate seals 30 at its passage through each of compressor end 20, center partition 22 and expansion chamber end 24. Shaft 26 may be splined or keyed to allow those structures mounted on it to slide longitudinally to accommodate assembly and thermal expansion. DuPont VESPEL® manufactures composite bearings and seals with adequate performance for this purpose.

Compressor section 16 encloses compressor 32. Compressor 32 is driven by shaft 26 and may be any sort of compressor known to the compressor arts. Compressor 32 is preferably a radial compressor capable of providing sufficient pressure and gas volume to charge combustion chamber 14. Compressor 32 is preferably an axial single-direction compressor.

Combustion chamber 14 generally includes combustion chamber enclosure 34, compressor check valve 36, fuel injector 38, temperature sensor/glow plug 40, coolant injector 42 and pass gate sentry valve (PGSV) 44. Combustion chamber 14 may be designed in various shapes to meet the configuration needs of engines for different specific fuels. For example, combustion chamber 14 may be shaped differently for engines burning unleaded gasoline, propane, #2 fuel oil, natural gas or hydrogen. Hydrogen may be supplied by a Hydrogen on Demand™ system, available from Millennium Cell Inc.

The combustion chamber is constructed from a material tolerant to explosive shock and conductive of thermal energy. For example, combustion chamber 14 may be constructed of carbon-carbon fiber composites or ceramic as well as cast iron, steel, aluminum or other conventional materials. Information on carbon-carbon composites is available from the National Aeronautics and Space Administration. Combustion chamber 14 may be placed in a deliberate position relative to housing 12, so as to salvage thermal energy from the exhaust as the hot gases pass around the combustion chamber 14 exterior.

Compressor reed valve 35 separates compressor 32 from compressor check valve 36. Compressor check valve 36 includes valve body 46, spring 48, and washer 50. Compressor check valve 36 allows fluid communication between compressor 32 and combustion chamber 14 when open. Compressor check valve 36 allows fluid flow from compressor 32 into combustion chamber 14 when open, while preventing backflow when closed.

Fuel injector 38, temperature sensor/glow plug 40, and, as required for a non-diesel fuel, spark plug 41 are well-known in the internal combustion engine arts and will not be described further.

Coolant injector 42 serves to inject a metered quantity of liquid coolant into combustion chamber 14. The liquid coolant itself will be described later in this disclosure.

Pass gate sentry valve (PGSV) 44 includes combustion gas passages 52, valve body 54, valve piston 55, valve seat 56 and spring 58. PGSV 44 is enclosed in PGSV chamber 60. Combustion gas passages 52 provide fluid communication between combustion chamber 14 and PGSV chamber 60. Valve body 54 is held firmly against valve seat 56 by spring 58. PGSV 44, when open, provides fluid communication between combustion chamber 14 and expansion section 18.

Expansion section 18 includes expansion chamber redirecting surface 62, stator body 64 and exhaust port 68. Stator body 64 along with center partition 22 and expansion chamber end 24, define expansion chamber 70. Center partition 22 and expansion chamber end 24 define cam tracks 72 therein. Cam tracks 72 are generally race track-shaped and eccentrically located about shaft 26. Expansion chamber 70 is generally circular in shape, with a flattened portion at the upper edge thereof, as is readily apparent from FIG. 5. Stator body 64 further defines rotor seal cavity 74 in which rotor seal 76 is seated.

Figure 5:
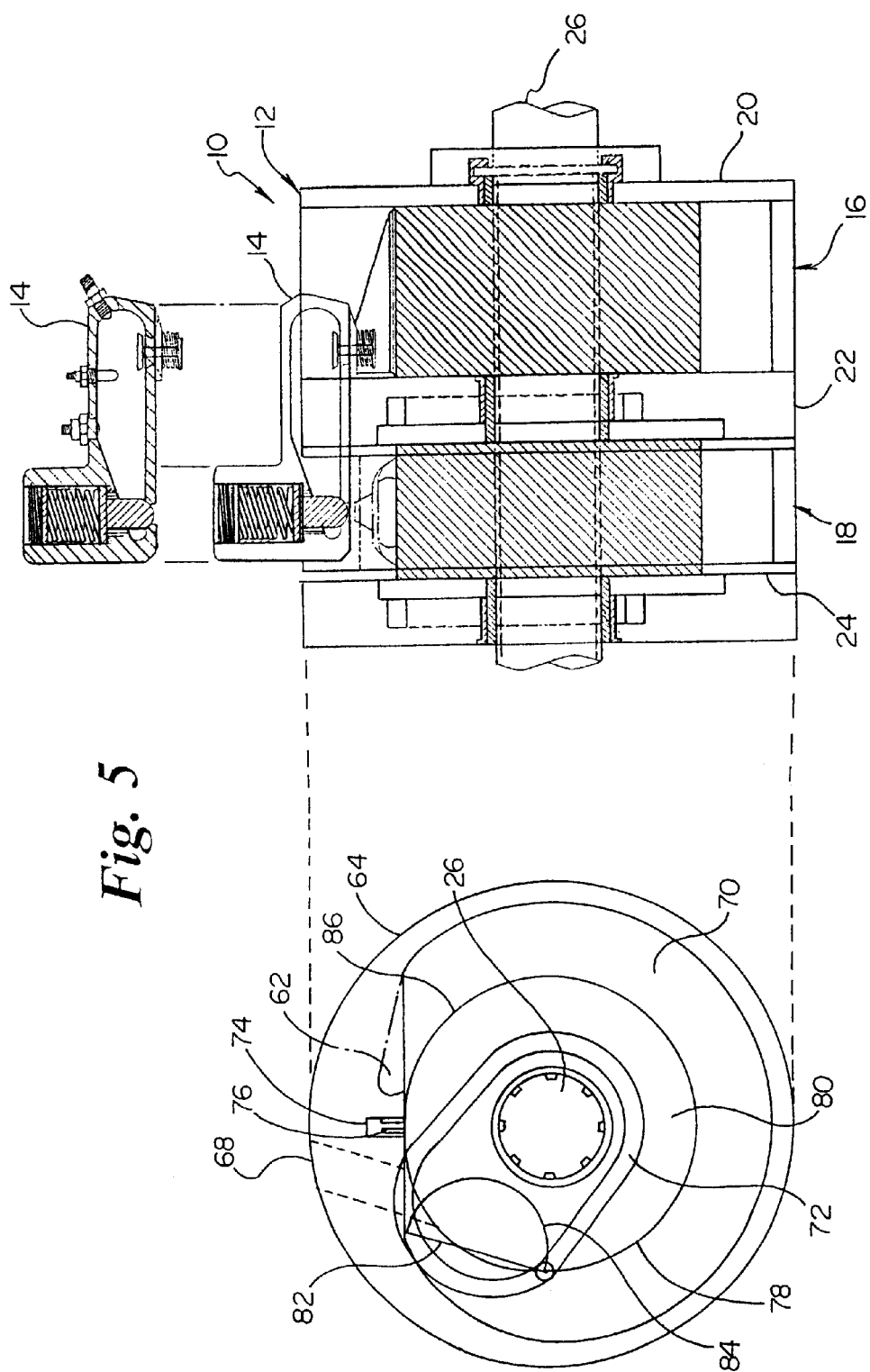
FIG. 5 is a side sectional end view through and expansion chamber according to an embodiment of the present invention.

Further referring to FIG. 5, oscillating piston assembly 78 is enclosed within expansion chamber 70. Oscillating piston assembly 78 includes piston hub 80 and crescent piston 82. Piston hub 80 is rotationally secured to shaft 26 while being free to slide longitudinally. Crescent piston 82 is seated in a saddle 84 on the outer diameter 86 of piston hub 80.

Figure 7:
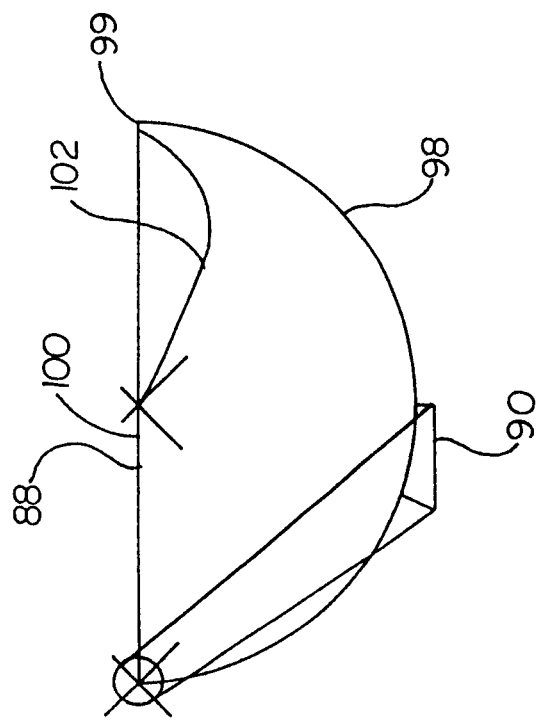
FIG. 7 is a front elevational view of the crescent piston of FIG. 6 according to an embodiment of the present invention.
Figure 6:
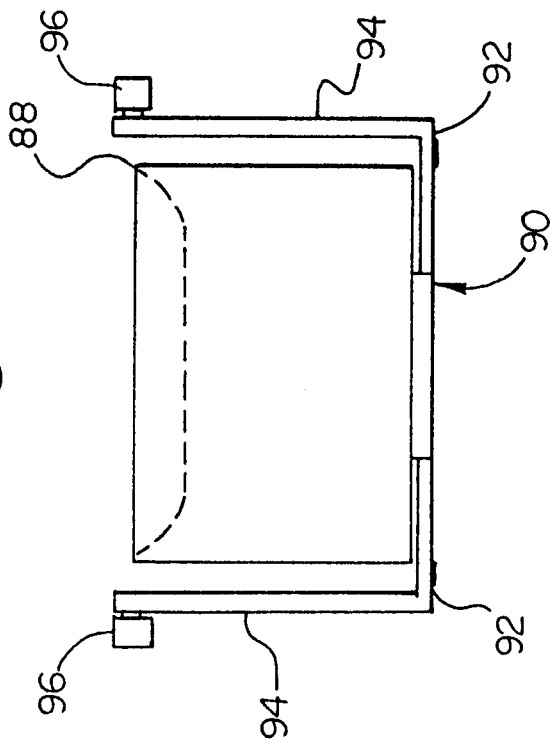
FIG. 6 is a side elevational view of a crescent piston according to an embodiment of the present invention.

Referring particularly to FIGS. 6 and 7, crescent piston 82 generally includes piston body 88 and piston actuator arm assembly 90. Piston actuator arm assembly 90 includes actuator arms 92, cam arms 94 and cam followers 96. Cam followers 96 are sized to fit closely but to travel freely within cam tracks 72.

Piston body 88 is generally crescent-shaped and defines an arcuate face 98, leading edge 99 and a flat face 100. Flat face 100 further defines a concave piston face contour 102. Arcuate face 98 is sized and shaped to fit closely and movably into saddle 84. Leading edge 99 is adapted to follow closely and scour the inner surface of stator body 64.

Referring particularly to FIG. 8, as piston hub 80 and crescent piston 82 rotate about shaft 26 within expansion chamber 70, crescent piston 82 defines a path of travel as illustrated in sequential sub FIGS. 8A, 8B, 8C and 8D. As can be seen from FIG. 8, the interaction of cam follower 96 with cam tracks 72, in combination with the interaction between piston body 88 and saddle 84, define the motion of crescent piston 82. This relationship maximizes surface area for gases with an expansion chamber 70 to push against.

Coolant injector 42 is used to inject an injection fluid coolant into combustion chamber 14 during the combustion process. Water injection is well known in the art and has been employed in reciprocating engines since the 1930s. The term "injection fluid coolant" is intended here to mean any non-fuel fluid introduced into the positive displacement turbine 10 internal combustion engine. The injection fluid coolant is made, preferably, of water and a small amount of a chemical alkali; for example, calcium hydroxide or calcium phosphate. The concentration of the alkali component preferably corresponds to the amount of acidic combustion by products produced by the engine during the combustion process. Thus, sufficient base, such as calcium hydroxide, is mixed with the injector fluid to react with and neutralize the resulting acids formed in the combustion process. As is well known, the acid-base reaction yields water and a salt. The case of calcium hydroxide with sulfuric acid is as follows:

$$Ca(OH)_2 + H_2SO_4 \rightarrow CaSO_4 \cdot 2H_2O$$

In operation, compressed air is taken in and compressed by compressor 32. Compressed air is forced through compressor check valve 36 into combustion chamber 14. When the pressure has equalized between the outside of compressor check valve 36 and the inside of combustion chamber 14, compressor check valve 36 closes. After the closing of compressor check valve 36, fuel injector 38 injects a metered quantity of fuel to mix with the compressed air already in combustion chamber 14. Compression ignition then occurs to ignite the fuel-air mixture. Alternatively, a spark plug 41 may be provided to the combustion chamber to ignite the fuel-air, depending on the type of fuel used.

Simultaneously with combustion, coolant injector 42 injects a charge of coolant into combustion chamber 14. Coolant may be injected at another point in time during the combustion cycle, such as prior to the introduction of the compressed air. Coolant is converted to steam with a consequent increase in combustion chamber pressure and reduction in temperature. The gas pressure created by the combustion process forces gas into and through combustion gas passages 52 and acts on valve piston 55. This opens PGSV 44. Hot expanding combustion gases then cause PGSV 44 to open, allowing the hot combustion gases, along with the gaseous coolant, to leave combustion chamber 14 and expand into expansion chamber 70.

At this point in time, crescent piston 82 is located at the top dead-center position, as depicted in FIG. 8A. The hot combustion gases pass over expansion chamber redirecting surface 62 and then apply force to piston face contour 102. The force applied causes piston hub 80 to rotate in a clockwise direction, as depicted in FIGS. 8B, 8C and 8D.

It should be noted that crescent piston 82 absorbs energy from the hot combustion gases throughout substantially its entire rotation. The location of exhaust port 68 allows the piston to receive force from the hot combustion gases throughout an effective approximate 370° of rotation. The 370° includes a 330° primary exhausting plus a secondary 40° exhausting. Exhaust gas begins to leave expansion chamber 70 at about 330° of rotation and continues for about another 40°. The expanding combustion gases are still applying force to arcuate face 98 of crescent piston 82, while the next charge of combustion gas is beginning to apply force to piston face contour 102 during the following cycle.

The crescent piston 82 employs the back pressures of the previous combustion cycle to create a sealing force between events. The action of crescent piston 82 and leading edge 99, in addition to the aerodynamic shape of the piston, accomplishes this. The leading edge 99 of the crescent piston 82 pushes against the previous cycle of gases to exhaust them from the expansion chamber 70. Sustained high operating temperatures within the positive displacement turbine 10 promote a complete combustion reaction leaving few particulates. Hydrocarbon fuels reacting with oxygen in the air produce large quantities of water vapor or live steam as a product of the reaction. Additional steam is generated from the coolant injected in the combustion chamber 14.

Expansion chamber 70 has a perimeter shape to accommodate the movements of the crescent piston 82. The perimeter of the expansion chamber 70 is a circle, flattened in one aspect. This shape may be referred to as a semi-oblate circle.

Expansion chamber redirecting surface 62 is shaped to direct combustion gases at piston face contour 102 and to create a turbulent, circular, centrifugal flow of combustion gases within expansion chamber 70. Crescent piston 82 includes piston face contour 102 which tends to redirect hot exhaust gases upward and outward, creating a cyclonic gas movement along outer diameter 86 of piston hub 80, and then in a reverse direction along the interior of expansion chamber 70. This cyclonic movement of rotating hot gases creates an extremely turbulent gas circulation. This encourages complete oxidation of all components of the fuel. A fundamental principal of the expansion chamber 70 is that the more turbulent the gases in the expansion chamber 70, the lower the exhaust gas temperature. The cyclonic movement of hot combustion gases also facilitates the chemical reactions between acidic components of the combustion process and the calcium hydroxide or other alkali in the injection cooling fluid, thus facilitating the pH neutralization of acid combustion products.

Further, the expansion of injection fluid coolant into expansion chamber 70 tends to recover thermal energy that would otherwise be wasted through a cooling or exhaust system. Regulating of engine operating temperature may be achieved by monitoring the exhaust gas temperature and by using this data to meter the amount of injection fluid coolant injected.

The PDT 10 engine is configured to take advantage of the high temperatures developed in the combustion chamber 14 to salvage excess thermal energy. Coolant introduced into combustion chamber 14 is converted into live steam, thereby transferring additional force to the drive shaft as useful work. This salvaging of excess thermal energy tends to reduce the need for external air-cooling fins or water jackets. The PDT 10 regulates its operating temperature through the use of injector fluid coolant. It is expected that, for every gallon of petroleum utilized in the PDT 10, one to six gallons of injector fuel coolant will be used to absorb excess thermal energy. Actual usage will depend upon engine load and conditions.

The present invention may be embodied in other specific forms without departing from the spirit of any of the essential attributes thereof. Therefore, the illustrated embodiments should be considered in all respects as illustrative and not restrictive, reference being made to the appended claims rather than to the foregoing description to indicate the scope of the invention.

I claim:

1. A rotary engine comprising:
    a combustion chamber;
    a semi cylindrical expansion chamber having an inner surface, the expansion chamber being in intermittent fluid communication with the combustion chamber; and
    a crescent-shaped oscillating rotary piston cradled in a hub within the expansion chamber and motion controlled such that, as the hub rotates, a leading edge of the crescent-shaped oscillating rotary piston closely follows the inner surface of the expansion chamber whereby expanding gases from the combustion chamber drive the crescent-shaped oscillating rotary piston.

2. The rotary engine of claim 1, further comprising a compressor to compress atmospheric pressure air and to direct the compressed air into the combustion chamber.

3. The rotary engine of claim 2, in which the compressor is a rotary compressor.

4. The rotary engine of claim 1, further comprising a pass gate sentry valve adapted to open when fuel combustion in the combustion chamber creates a predetermined pressure and to allow hot combustion gases produced thereby to expand into the expansion chamber.

5. The rotary engine of claim 1, further comprising a fuel injector to inject fuel into the combustion chamber.

6. The rotary engine of claim 1, further comprising a coolant injector to inject injection fluid coolant into the combustion chamber.

7. The rotary engine of claim 6, in which the injection fluid coolant comprises a solution of water and alkali solute.

8. The rotary engine of claim 6, in which the injection fluid coolant comprises a solution of water and calcium hydroxide.

9. The rotary engine of claim 1, in which the oscillating rotary piston comprises a flat face, an arcuate face, and an indented contour in the flat face.

10. The rotary engine of claim 1, wherein the inner surface defines a perimeter having a semi-oblate circular shape.

11. A rotary engine comprising:
    a combustion chamber;
    a semi cylindrical expansion chamber having an inner surface, the expansion chamber being in intermittent fluid communication with the combustion chamber; and
    a crescent-shaped oscillating rotary piston cradled in a hub within the expansion chamber and motion controlled such that, as the hub rotates, a leading edge of the crescent-shaped oscillating rotary piston closely follows the inner surface of the expansion chamber whereby expanding gases from the combustion chamber drive the crescent-shaped oscillating rotary piston in a generally continuous rotary motion, wherein the crescent-shaped oscillating rotary piston further comprises a cam follower operably connected to the crescent-shaped oscillating rotary piston, the cam follower being adapted to guide the crescent-shaped oscillating rotary piston in its orientation in relation to the expansion chamber as the crescent-shaped oscillating rotary piston revolves.

12. A method for converting chemical energy to rotary motion, comprising:
    compressing atmospheric air and forcing the compressed air into a combustion chamber;
    injecting fuel into the combustion chamber;
    burning the fuel;
    opening a pass gate sentry valve via application of pressure created by hot combustion gases created by the burning process;
    expanding the hot combustion gases into an expansion chamber; and
    forcing a crescent-shaped oscillating rotary piston operably connected to a shaft to rotate in response to interaction with the hot combustion gases.

13. The method of claim 12, further comprising the step of injecting a liquid-based injection fluid coolant into the combustion chamber.

14. The method of claim 13, further comprising the step of formulating the injection fluid coolant of a solution of water and an alkali solute.

15. The method of claim 13, further comprising the step of formulating the injection fluid coolant of a solution of water and calcium hydroxide.

16. A rotary engine comprising:
    a compressor to compress atmospheric pressure air;
    a combustion chamber in which fuel combustion occurs, the combustion chamber being in controllable intermittent fluid communication with the compressor via a check valve;
    a pass gate sentry valve adapted to open when fuel combustion in the combustion chamber reaches a predetermined pressure;
    an expansion chamber having a generally circular-shaped inner surface flattened in one aspect, the expansion chamber being in intermittent fluid communication with the combustion chamber via the pass gate sentry valve; and a semicircular oscillating rotary piston cradled in a hub and controlled such that, as the hub rotates, a leading edge of the semicircular oscillating rotary piston closely follows the inner surface of the expansion chamber whereby expanding gases from the combustion chamber drive the semicircular oscillating rotary piston in a generally continuous rotary motion.

17. A rotary engine, comprising:

a combustion chamber; and an expansion chamber including an oscillating rotary piston operably connected to a shaft, the oscillating rotary piston being driven rotationally by expanding combustion gases, the oscillating rotary piston and combustion chamber further being adapted such that the oscillating rotary piston converts the energy of the expanding gases into rotational motion through substantially the entirety of each revolution of the oscillating rotary piston, wherein the oscillating rotary piston comprises a flat face, an arcuate face and an indented contour in the flat face.

18. The rotary engine of claim 17, further comprising a compressor to compress atmospheric pressure air and to direct the compressed air into the combustion chamber.

19. The rotary engine of claim 18, in which the compressor is a rotary compressor.

20. The rotary engine of claim 17, further comprising a pass gate sentry valve adapted to open when fuel combustion in the combustion chamber creates a predetermined pressure and to allow hot combustion gases produced thereby to expand into the expansion chamber.

21. The rotary engine of claim 17, further comprising a fuel injector to inject fuel into the combustion chamber.

22. The rotary engine of claim 17, further comprising a coolant injector to inject injection fluid coolant into the combustion chamber.

23. The rotary engine of claim 22, in which the injection fluid coolant comprises a solution of water and alkali solute.

24. The rotary engine of claim 22, in which the injection fluid coolant comprises a solution of water and calcium hydroxide.

25. The rotary engine of claim 17, in which the oscillating rotary piston further comprises a cam follower operably connected to the oscillating rotary piston, the cam follower being adapted to guide the oscillating rotary piston in its orientation in relation to the expansion chamber as the oscillating rotary piston revolves.

* * * * *